United States Patent [19]
Candelore

[11] Patent Number: 6,057,872
[45] Date of Patent: May 2, 2000

[54] DIGITAL COUPONS FOR PAY TELEVISIONS

[75] Inventor: Brant Candelore, San Diego, Calif.

[73] Assignee: General Instrument Corporation, Horsham, Pa.

[21] Appl. No.: 08/890,066

[22] Filed: Jul. 9, 1997

[51] Int. Cl.[7] .................................................. H04N 7/10
[52] U.S. Cl. .................................................. 348/3; 348/10
[58] Field of Search ..................... 709/217–219; 345/327, 328; 348/6, 7, 8, 3, 1, 10, 12, 13, 2; 455/4.1, 4.2, 5.1, 52; H04N 7/10

[56] References Cited

U.S. PATENT DOCUMENTS

| | | |
|---|---|---|
| 4,876,592 | 10/1989 | Von Kohorn . |
| 5,128,752 | 7/1992 | Von Kohorn . |
| 5,249,044 | 9/1993 | Von Kohorn . |
| 5,260,778 | 11/1993 | Kauffman et al. . |
| 5,532,735 | 7/1996 | Blahut et al. ............................ 348/13 |
| 5,604,542 | 2/1997 | Dedrick . |
| 5,610,653 | 3/1997 | Abecassis ............................... 348/110 |
| 5,838,314 | 11/1998 | Neel et al. .............................. 345/327 |

FOREIGN PATENT DOCUMENTS

| | | |
|---|---|---|
| 0 656 728 | 6/1995 | European Pat. Off. . |
| 0 833 511 | 4/1998 | European Pat. Off. . |
| WO 96/32702 | 10/1996 | WIPO . |

*Primary Examiner*—Nathan Flynn
*Attorney, Agent, or Firm*—Barry R. Lipsitz; Ralph F. Hoppin

[57] ABSTRACT

Digital coupons are selectively transmitted in a communication network to subscriber terminals for promotional purposes. Subscribers automatically receive coupon credits when they meet the preconditions of the digital coupons. Free or reduced price pay-per-view (PPV) programming in particular may be provided when a subscriber purchases a given number of PPV programs at a regular price. The terminals maintain a running balance of available coupon credits and inform the subscriber via a user interface of the available balance. Subscribers can be rewarded for viewing commercial messages by awarding coupons which can be immediately redeemed for PPV programs. With an optional report back capability, terminal usage pattern data can be retrieved and analyzed by program service providers to determine the effectiveness of the promotions and to gather additional demographic and individual data. The integrity of the scheme is assured with encryption techniques.

51 Claims, 7 Drawing Sheets

```
400

410  YOU ARE NOT SUBSCRIBED TO THE PROGRAM.

420  HOW DO YOU WISH TO VIEW THE MOVIE?

430  YOUR OPTIONS ARE:

440     a) IMPULSE PAY-PER-VIEW
                         -THE COST IS $3.50 FOR THE MOVIE.
                         -YOU HAVE   $27.50 CREDIT.

450     b) COUPONS       -THE COST IS 7 TV COUPONS.
                         -YOU HAVE   13 TV COUPONS.

460     a) IMPULSE PAY-PER-VIEW WITH DISCOUNT
                         -THE COST IS $1.50 WITH 4 TV COUPONS.
                         -YOU HAVE   $27.50 CREDIT AND
                         13 TV COUPONS.
```

400

410 — YOU ARE NOT SUBSCRIBED TO THE PROGRAM.

420 — HOW DO YOU WISH TO VIEW THE MOVIE?

430 — YOUR OPTIONS ARE:

440 — a) IMPULSE PAY-PER-VIEW
- THE COST IS $3.50 FOR THE MOVIE.
- YOU HAVE $27.50 CREDIT.

450 — b) COUPONS
- THE COST IS 7 TV COUPONS.
- YOU HAVE 13 TV COUPONS.

460 — a) IMPULSE PAY-PER-VIEW WITH DISCOUNT
- THE COST IS $1.50 WITH 4 TV COUPONS.
- YOU HAVE $27.50 CREDIT AND 13 TV COUPONS.

COUPON LEDGER

| COUPONS | | COUPONS | |
|---|---|---|---|
| HBO: | 4 | TVN: | 7 |
| SHOWTIME: | 6 | THE MOVIE CH. | 1 |
| CINEMAX: | 3 | CNN: | 4 |
| AMC: | 8 | WGN: | 2 |
| DISNEY: | 3 | DISCOVERY: | 6 |

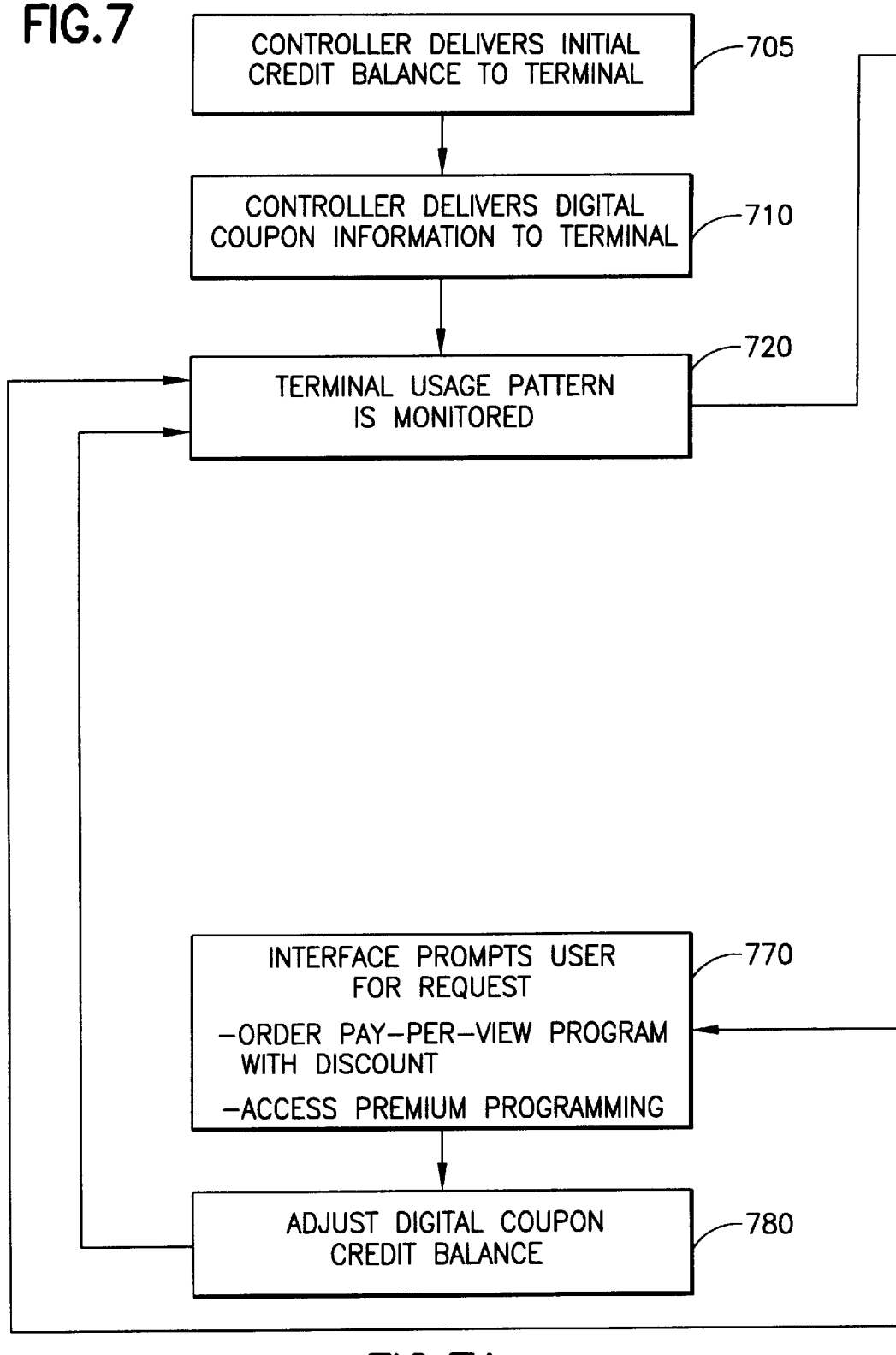

DIGITAL COUPONS FOR PAY TELEVISIONS

BACKGROUND OF THE INVENTION

The present invention relates to communications networks such as cable television, satellite television and computer networks over which services are available for a fee. In particular, an apparatus and method are presented for allowing users of services such as pay television to obtain credits when viewing particular programs. The invention enables service providers to transmit credit information in the form of "digital coupons" to individual subscriber terminals to promote particular programs and reward viewer loyalty.

Cable and satellite television networks where video services are available for a fee are well known. Also well known are computer network services such as CompuServe, Prodigy, America Online, Knight-Ridder Information Service, and others where databases, banking and shopping services can be accessed and e-mail and the like can be communicated, all for a fee. In the past, some networks have provided services on a free trial basis. For example, during promotional periods lasting for one or two days, premium programming services such as movie or sports channels could be viewed by subscribers who normally would have to pay an additional charge to receive such programming. In most cases, this is done by placing the entire service into some sort of promotional scrambling mode where the programs are either not scrambled, i.e. in-the-clear, or use fixed keys which are known to all subscriber terminals. For example, in a broadcast environment, service providers do not know which existing customer or potential new customer is attempting to access a particular service. Even if feedback could be obtained, for example, using a telephone line or some upstream path, there would be too many transactions of customers tuning in and out of services for the service provider to usefully analyze.

Consequently, the service must usually be placed in a scrambling mode which allows free accessed by everyone, including potential new customers and even existing customers, or at least a large defined group. Moreover, an extended period of free service time is usually needed to effectively promote services since the different programs which are made available during the free preview will appeal to different interest, demographic, and age groups of viewers. For example, some viewers may prefer to see action movies while others prefer to see comedies. Thus, it is necessary to provide a wide variety of free programming over an extended period of time to effectively encourage viewers to subscribe to the premium programming services for an additional monthly charge.

During the free preview period, renewal and new subscriptions rates may be reduced to further motivate the customer since the customer may otherwise wait until after the free preview period is over to order new services which may, in turn, stress the call handling capability of the service provider's subscription center.

Additionally, various programs may be offered on an individual or a-la-carte pay-per-view (PPV) basis, where the subscriber pays a fee to view a single program. The customer may either call ahead to the subscription center to have a specific authorization or entitlement for a single program sent to the customer's terminal, or the customer can arrange to have a certain amount of monetary credit downloaded into the customer's terminal. With the selection of PPV program, the pre-stored credit amount in the terminal is reduced. Such PPV may be offered at fixed times or staggered times with so-called Near Video On Demand (NVOD). Also programs may be delivered essentially instantaneously with Video On Demand (VOD).

In VOD system systems, the program can be delivered on demand to a specific subscriber when that subscriber communicates a buy signal to a video server located at a cable television system headend. The buy signal may be communicated, for example, through an available upstream channel in a cable television network, or via a telephone line.

Various marketing techniques have been used to encourage subscribers to purchase pay-per-view programs. PPV usually are more profitable for the service provider than subscription services. These marketing techniques include providing the subscriber with a credit on his monthly statement when the subscriber purchases a predetermined number of PPV programs, or spends a predetermined amount of money on PPV programs. Or, the subscriber may be mailed a paper coupon which the subscriber can later mail back to the network billing department to obtain a discount after the subscriber has met the preconditions for redeeming the coupon. For example, the paper coupon may entitle the subscriber to a credit of one-half the price of a PPV program when one PPV program is purchased at the regular price.

While such marketing techniques can be effective, some subscribers may become accustomed to receiving paper coupons and other discounts on their monthly statements and may then resist paying higher fees when such discounts are not offered. In other words, they will only buy if they get a coupon. It would be desirable to reward the subscribers after they have met some predetermined conditions. Additionally, it is not easy to selectively target groups of subscribers or individual subscribers, without making the entire service free, or to monitor the effectiveness of such promotions. Moreover, the effectiveness of conventional promotions may be reduced because the realization of the discount by the subscriber is delayed, typically for a number of weeks due to delays in the billing cycle. Furthermore, paper coupons are difficult to organize and handle and are easily lost.

Accordingly, it would be desirable to provide a method and apparatus for allowing selective targeting of promotions of programming services to particular subscribers or groups of subscribers without placing services in free mode, or using paper coupons. The system should allow subscribers to receive an immediate credit when a predetermined viewing pattern has been met. The system should reward subscriber loyalty and encourage subscribers to purchase additional programming services such as PPV programs and/or additional levels of service, such as premium programming services.

The system should also organize the credits in a way to allow the subscriber to take a quick inventory, and should inform the subscriber when a service is available through the promotion. The system should allow flexibility as to how the credits may be used, for example, in regard to the variety of shows, times, and dates the programming may be accessed.

Furthermore, it would be desirable to provide a system for monitoring the success of such promotions, gain feedback on subscriber viewing habits, and determine the viewership (e.g., audience size) of particular programs. The system should employ cryptographic techniques to thwart unauthorized persons (e.g., pirates) who attempt to tamper with the system for illicit gain.

The present invention provides a system having the above and other advantages.

SUMMARY OF THE INVENTION

In accordance with the present invention, an apparatus and method are presented for allowing users of services such as pay television to obtain credits when viewing particular programs. The invention enables program service providers to transmit credit information in the form of "digital coupons" to individual subscriber terminals to promote particular programs and reward viewer loyalty.

A communication system in accordance with the present invention includes a controller for transmitting program services to a plurality of subscriber terminals via a communication channel. The program service may include television programs which are broadcast or continuously transmitted on a predetermined schedule, pay-per-view programs which require specific user selection and either a local transacted or remotely transacted purchase, Near Video-On-Demand which is pay-per-view offered at staggered broadcast times, and Video-On-Demand services, which are transmitted only in response to a user request, or other electronic information such as computer software.

The communication channel may include a cable plant and/or satellite link, for example. The program services can be selectively recovered by the subscriber terminals. For example, a subscriber may select a particular program to view by tuning in the corresponding channel using an on-screen interface, e.g. Electronic Program Guide (EPG), and a remote control unit, or by transmitting a buy order for either PPV or Video-On-Demand programming.

The controller can deliver digital coupon information to the terminals along with program service data using any available technique, such as frequency or time multiplexing. The digital coupon information allows the terminals to obtain credits when recovering particular programs as defined by preconditions of the digital coupon information. For example, the subscriber may receive a credit for one free PPV program when the precondition of purchasing five PPV programs at regular prices has been met. The terminal automatically tracks the balance of coupon credits as coupons are awarded and redeemed. The credits are usable in obtaining program services at a reduced charge (e.g., at a discount or free).

Each terminal includes a processor which monitors a usage pattern (e.g., viewing history) of the terminal to determine if the preconditions of the digital coupon information have been satisfied. For example, the usage pattern may indicate which programs have been recovered by the terminal within the last month, or some other period, or the length of time that a particular program, or program service (e.g., channel) was viewed. The terminal may simply grant coupons based on the purchase of a PPV program, or based on the amount of time spent viewing an infomercial. The credits are thus awarded when there is a correlation between the usage pattern and the preconditions of the digital coupon information.

A user interface such as a graphical user interface (e.g., on-screen display) may be provided to allow the subscriber to selectively redeem the credits. For example, the user may have a variety of options from which to choose, where a cash balance and/or a coupon balance are redeemed in full or in part. The user interface can also be used to obtain a confirmation of user involvement. For example, to verify that the subscriber is still viewing a program, he may be periodically required to provide some sort of control input as the program is displayed.

When the program services include individual programs which can be individually recovered by the terminals, such as with a PPV scheme, the coupon credits are awarded when the usage pattern indicates that a terminal has recovered a particular number of such individual programs, or a particular amount of charges. This allows a coupon credit to be awarded whenever a PPV program has been accessed. One or more coupons may need to be redeemed in order to access a program.

To allow program service providers and advertisers to obtain and analyze the terminal usage data, a usage pattern accounting center which is associated with a network controller may be provided. The usage pattern accounting center can receive usage pattern data from the terminals via a communication link, such as an upstream path in the channel over which the program services are transmitted, or a telephone network. This is especially useful for determining the viewership of commercials or infomercials wherein the cost of running the ad in a program is oftentimes a function of the estimated viewing audience.

Moreover, the network controller can control the delivery of the digital coupon information to the terminals based on the received usage pattern data. In this case, the network controller can deliver the digital coupons directly to the terminal in a similar fashion as with other entitlements such as subscription entitlements, PPV entitlements, and credit information. For example, subscribers who demonstrate a preference for sports programs can receive digital coupon information which provides discounts for future special sports events.

The controller can thus deliver different digital coupon information to the different subscriber terminals based on the usage pattern data or other demographic or individual data which has been compiled by other means. The digital coupon information can provide different preconditions for obtaining the same credits, or the same preconditions for obtaining different credits. For example, it is possible to reward favored subscribers such as those who purchase relatively more programming by providing the favored subscribers with more coupons than other, less favored, subscribers when the same viewing preconditions are met.

Various cryptographic techniques may also be employed to prevent unauthorized access to the digital coupons.

A corresponding subscriber terminal and method are also presented.

BRIEF DESCRIPTION OF THE DRAWINGS

FIG. 4 is an on-screen display for a user interface in accordance with the present invention.

FIG. 5 is another on-screen display for a user interface in accordance with the present invention.

DETAILED DESCRIPTION OF THE INVENTION

A method and apparatus are presented for allowing users of program services such as pay television to obtain credits when viewing particular programs. The invention enables program service providers to transmit credit information in the form of "digital coupons" to individual subscriber terminals to promote particular programs and reward viewer loyalty. The digital coupons may be generated locally in the terminals based on criteria sent by the service providers, or transmitted directly as an entitlement by the service provider.

Figure 1:
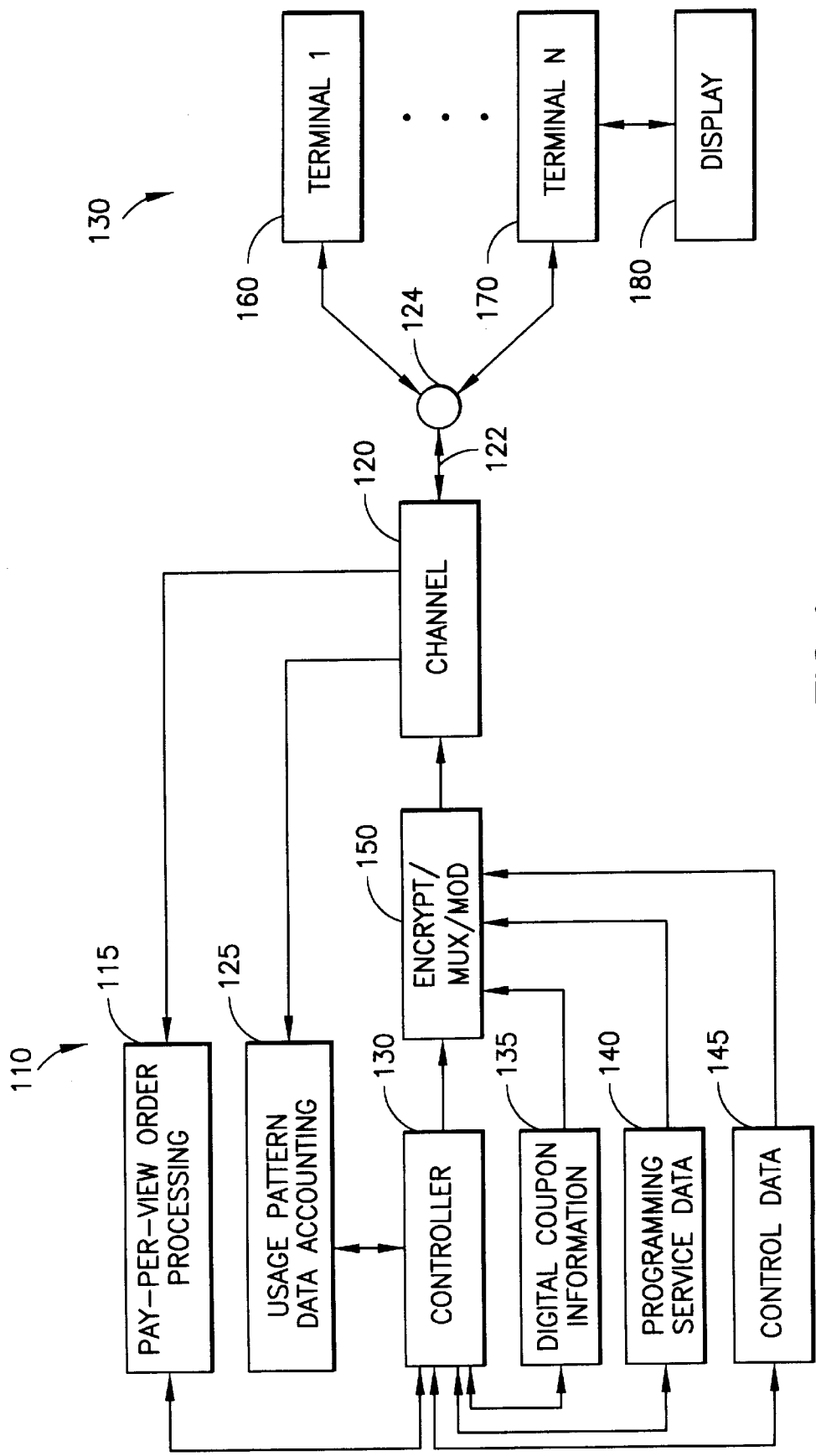
FIG. 1 is a block diagram of a communication system in accordance with the present invention.

FIG. 1 is a block diagram of a communication system in accordance with the present invention. The system includes a transmitting end, shown generally at 110, a channel 120, and a receiving end, shown generally at 130. The transmitting end 110 includes a central controller 130 which communicates with a PPV order processing function 115, a terminal usage pattern data accounting function 125, an encryptor/multiplexer/modulator 150, a digital coupon information function 135, a program service data function 140, and a control data function 145.

The receiving end 130 includes a number of terminals including terminal 1 (160) through terminal N (170), which receive the digital coupon information, program service data, and control data via a hub 124 and path 122. Each terminal has an associated display such as a television for displaying the program service data. For example, "terminal N" 170 has an associated display 180. In the example shown, the terminals 160, . . . , 170 are able to communicate with the PPV order processing function 115 and usage pattern data accounting function 125 via the channel 120.

For example, in a cable television network, such upstream communication may be provided on a channel (e.g., RF spectrum) which is separate from the channels over which the program service data is communicated. A frequency-division multiplexing scheme may be used to achieve this goal. Alternately, a time-division multiplexing scheme may be used, or the terminals 160, . . . , 170 may communicate with the PPV order processing function 115 and usage pattern data accounting function 125 via a separate communication link such as a telephone network. Moreover, as discussed in greater detail below, the present invention can be implemented without the PPV order processing function 115 and/or usage pattern data accounting function 125.

The channel 120 may comprise coaxial cable, optical fiber, and/or a wireless link such as a satellite or RF broadcast link. The transmitting end 110 of the system may be a cable television system headend, a satellite uplink center, or an RF broadcast center, for example.

The digital coupon information function 135 comprises a memory for storing digital coupon information in accordance with the present invention. The digital coupon information is communicated to the terminals 160, . . . , 170 at the receiving end 130 of the system. Furthermore, when the terminals 160, . . . , 170 are addressable, the digital coupon information may be targeted to individual terminals and/or to groups of terminals, for example, according to demographic data. Alternatively, the digital coupon information may be transmitted via a path which is separate from that of the program services.

The digital coupon information provides credits which the terminals can use for a number of purposes. For example, the digital coupon information may provide a discount when the terminals order one or more PPV programs through the PPV order processing function 115. As an example, if a terminal orders five PPV programs within the current billing cycle, the digital coupon credit may allow the terminal to order a sixth PPV program at no charge. Or, for terminals that order PPV programs infrequently, the digital coupon credit may allow the terminal to order a first PPV program at half-price. The digital coupon may be generated automatically based on program coupon criteria established by the service provider. This has the advantage of requiring no direct involvement by the service provider. This is also suitable for broadcast environments where the return path either does not exist, is slow, or not set-up for interactive transactions.

Alternatively, the digital coupon information may allow the terminals to access premium program services at a reduced charge, or at no charge, or allow the terminals to access other information, such as a software program, a computer game, a book in electronic form, a musical composition, an on-screen television program guide, movie or restaurant reviews, or other promotional, informational or educational material. For example, the digital coupon information may allow a terminal to access a premium movie channel for two days with each PPV purchase, or to download one computer video game, or to gain one hour of free connect time to a computer database.

The term "program service" is thus used herein to encompass television, multimedia, and other audio and/or video signals as well as computer software or virtually any other information that can be accessed by, and/or communicated to, the terminals via the channel 120. The term "credit" is used herein to indicate that the terminals are provided with a benefit such as a reduced or waived charge when accessing and/or obtaining program services via the channel, or for obtaining merchandise via the channel which is delivered to the subscriber by other means (e.g., by mail).

The terminals 160, . . . , 170 do not realize the credit which is offered with the digital coupon information until the terminals satisfy certain preconditions. Each terminal includes means for monitoring various factors which define the terminal's usage pattern data over a defined time period, including, for example, the number of PPV programs purchased, the amount of PPV charges incurred, whether, and for what duration, the terminal has been tuned to a particular program or program service, whether the terminal has recently upgraded to one or more premium program services, and whether a promotional period is in effect. The promotional period may apply to individual terminals, such as those of new subscribers, to selected groups of terminals, or to all terminals.

Accordingly, monitoring means in the terminals monitor the above factors to determine whether the usage pattern of the terminal corresponds with the preconditions of the digital coupon information. Optionally, in a "report-back" function, the usage pattern data is periodically transmitted from the terminals to the usage pattern data accounting function 125, for example, via the hub 124 and channel 120, or, alternatively, via a telephone network. For example, the usage data may be transmitted daily, weekly, or monthly.

Such usage pattern data provides valuable information for program service providers and advertisers which can be used to better target individual subscribers and groups of subscribers with products and services with which they are likely to be interested. Moreover, the usage pattern data allows the interested parties (e.g., promoters and advertisers) to determine the effectiveness of various promotions. For example, when the digital coupon information provides a one-half price PPV program to subscribers who infrequently order PPV, the success rate of the program can be determined from the usage pattern data at the function 125.

As another example, when the digital coupon information provides two free days of access to one of a number of available premium program services, the selected premium program service can be monitored, and the subscriber can be subsequently offered a digital coupon which allows him to upgrade to the selected premium program service, e.g., at one-half off the normal charge for the first month. Various other marketing strategies may be used with the present invention to enhance revenue and customer goodwill. For example, a subscriber may be given coupon credit for a free pay-per view movie on his birthday.

Moreover, the digital coupon balance may be adjusted according to lotteries or other contests or games. For example, subscribers may be able to enter a lottery for additional coupons if they spend a certain amount of money. Or, the subscriber may play interactive games of chance where the prizes and losses are determined in terms of coupons.

However, even if the usage pattern data is not reported back to the function 125, the monitoring means in the terminal can determine whether the usage pattern data meets the preconditions of the digital coupon information. Preferably, this is done in a secure manner to prevent tampering by pirates, as discussed in further detail below.

The controller 130 causes the digital coupon information from function 135 to be encrypted and multiplexed at the encryptor/mux/modulator 150 along with the program service data from function 140 and the control data from function 145. The program service data may comprise video and/or audio data which is stored locally on storage media, and/or which is received from an external source such as a satellite downlink. Alternatively, the program service data may comprise computer software or other electronic information.

The control data includes cryptographic data which is used for generating working keys at the terminals for decoding the received data. Typically, one or more premium program services are communicated with basic program services over the channel 120. Both the basic and premium program services may be accessed with possession of the appropriate group key or keys. The group key or keys are delivered as part of an Entitlement Management Message (EMM). Possession of the group key or keys along with the appropriate entitlement control data allows the terminals to recover program keys from the program data sent by the service provider in Entitlement Control Messages (ECM).

The program keys allow the derivation or decryption of the working keys which are used to encrypt the programming signal at the uplink or headend side, and to decrypt the program signals on the downlink or consumer decoder side. The term "recover" is used herein to indicate that a program service is received at a terminal and retrieved for use (e.g., display) by the subscriber.

The control data included in an Entitlement Control Message (ECM) is used to control access to a particular program service (i.e., channel). The ECM control data tells the terminal which entitlement needs to be held by the terminal in order to be authorized to access and recover the particular program service. Typically, the ECM message which delivers the control data information is also used to deliver the program key information. The ECM message therefore not only defines program parameters but also delivers a key or precursor key (e.g., pre-key).

The ECM control data may further include data for providing the terminals with the cost for ordering a PPV program. This control data may further indicate the cost, in terms of the number, and type of coupons required to access the program, along with other details listing what number of coupons is required for a discount, and so forth.

Figure 2:
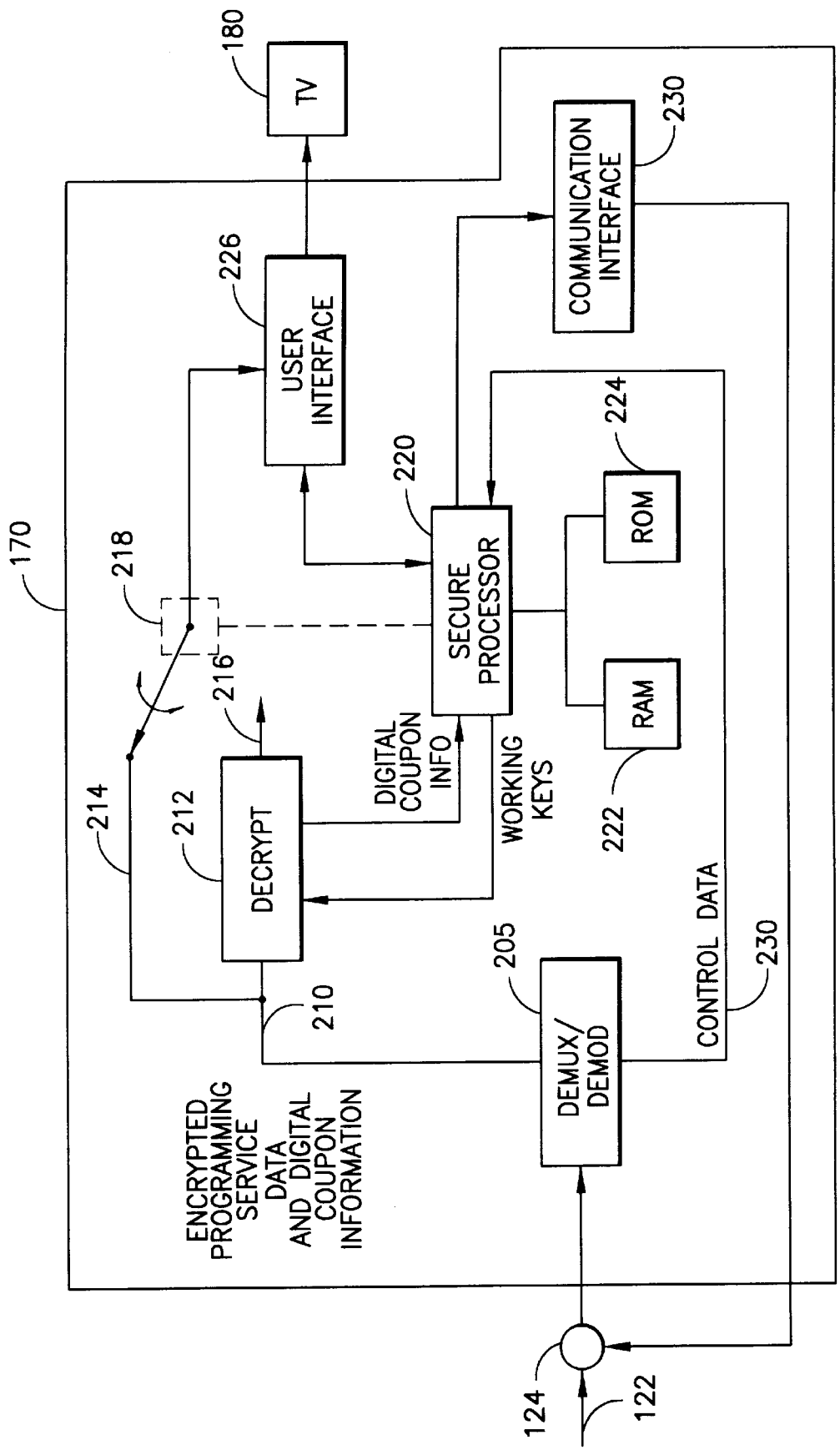
FIG. 2 is a block diagram of a subscriber terminal in accordance with the present invention.

FIG. 2 is a block diagram of a subscriber terminal in accordance with the present invention. Like-numbered elements correspond to the elements of FIG. 1. A demultiplexer/demodulator 205 of the terminal 170 receives the program service data, digital coupon information, and control data from the path 122 and hub 124. Demultiplexing and demodulating is performed using conventional techniques. The encrypted program service data is provided to a decryption processor 212 and a switch 218 via lines 210 and 214, respectively, while the encrypted control data and digital coupon information are provided to a secure processor 220 via line 230.

The encrypted program service is decrypted by the decryption processor 212 to provide a clear signal at output 216 of the decryption processor. The secure processor 220 may receive the decrypted digital coupon information from the decryption processor 212. The decryption processor 212 can utilize a conventional decryption scheme, such as that disclosed in Gilhousen, et al., U.S. Pat. No. 4,613,901 entitled "Signal Encryption and Distribution System for Controlling Scrambling and Selective Remote Descrambling of Television Signals," or Bennett et al., U.S. Pat. No. 4,864,615 entitled "Reproduction of Secure Keys By Using Distributed Key Generation Data," both incorporated herein by reference.

The decryption processor requires working keys (WK) to decrypt the signals input thereto via line 210. The working keys are generated by the secure processor 220 in response to the control signals received via line 230. Firmware for the secure processor is stored in read only memory (ROM) 224. The secure processor 220 is also provided with random access memory (RAM) 222. A secure portion of the RAM 222 holds unit specific keys and/or seeds for use in decryption of a monthly group key, as discussed in greater detail in connection with FIG. 3.

A user interface 226 enables a viewer to select program services for viewing on a television (TV) 180. If a user is authorized to receive the selected service by subscription, individual purchase (e.g., pay per view), or according to a digital coupon credit, the secure processor 220 will actuate the switch 218 to couple the decrypted output 216 from decryption processor 212 to the TV 180 via user interface 226. Otherwise, the user interface and TV will only receive the encrypted signal via line 214 and switch 218. As will be appreciated by those skilled in the art, switch 218 could alternatively be configured to provide a barker channel (e.g., a fixed message) to the user, or no signal at all, in the event that the user is not authorized to access the selected service.

The secure processor 220 monitors the programming which is selected by the user via the user interface 226 to determine whether the user has met the preconditions for obtaining the digital coupon credit. For example, if the digital coupon provides a credit for one free PPV program when five PPV programs are purchased at the regular price, the secure processor will record each occurrence of a purchase of a PPV program. The RAM 222 may be used to store the corresponding data. The usage pattern data thus includes data which is related to the digital coupon preconditions but can include other user selections as well. A communication interface 230 such as a data modem is provided to allow the terminal to transmit buy orders for VOD programming and certain types of programming which require a service provider's authorization for acquisition to the PPV order processing function 115 of FIG. 1. PPV purchases processed locally by the terminal and stored internally to the terminal may be forwarded to the PPV processing function for billing purposes. The interface 230 also allows the terminal 170 to transmit the usage pattern data to the usage pattern data accounting function 125 of FIG. 1.

The terminal receives control data in the form of an Entitlement Management Message (EMM) which provides an initial currency credit balance for the terminal 170. In this case, when a user orders PPV programs, for example, the overall currency credit balance is decreased by the cost of the programs. The EMM message originating from the service provider may or may not deliver an initial or additional coupon credit to the terminal.

Typically, coupon credit is generated when the preconditions for obtaining the digital coupon credit are realized. The coupon credit balance can be immediately adjusted. As an illustration, assume the initial credit balance is $40, and each PPV program costs $5. Then, the credit balance will drop successively to $35, $30, $25, $20 and $15 after the first five programs are purchased. At this time, the usage pattern data meets the preconditions of the digital coupon information, and the coupon credit balance gets incremented by one.

Alternatively, the coupon credit balance is incremented by one with each PPV purchase. When the terminal tunes in to the sixth program, the terminal receives a Entitlement Control Message (ECM) for the program. The terminal uses the ECM to determine the different ways that the program may be accessed. The ECM will also describe the currency cost and the coupon cost, if the program is available by coupon. The terminal will automatically determine whether or not the terminal has a coupon or coupons to acquire the program. If so, the program is automatically offered to the viewer, or the viewer is prompted to purchase the program using currency or coupons.

By choosing the coupon option, the next order for a PPV program is provided free, and the coupon credit field is decremented appropriately. Thus, the balance remains at $15. Alternatively, the terminal is charged for the sixth program, but the secure processor increments the credit balance by the cost, so there is no net change in the credit balance. The secure processor may provide a display on the user interface 226 that informs the viewer that the preconditions of the digital coupon information have been met. Of course, it is possible for coupon credits to accumulate when the corresponding preconditions are met but the credits are not realized, i.e., cashed in. The credits may be retained in the terminal for a predetermined period such as two or three months, or indefinitely. The secure processor may inform the subscriber if the credits are about to expire.

As described in further detail below in connection with FIGS. 4–6, the viewer may query the user interface 226 to determine the credit balance along with other related information.

Figure 3:
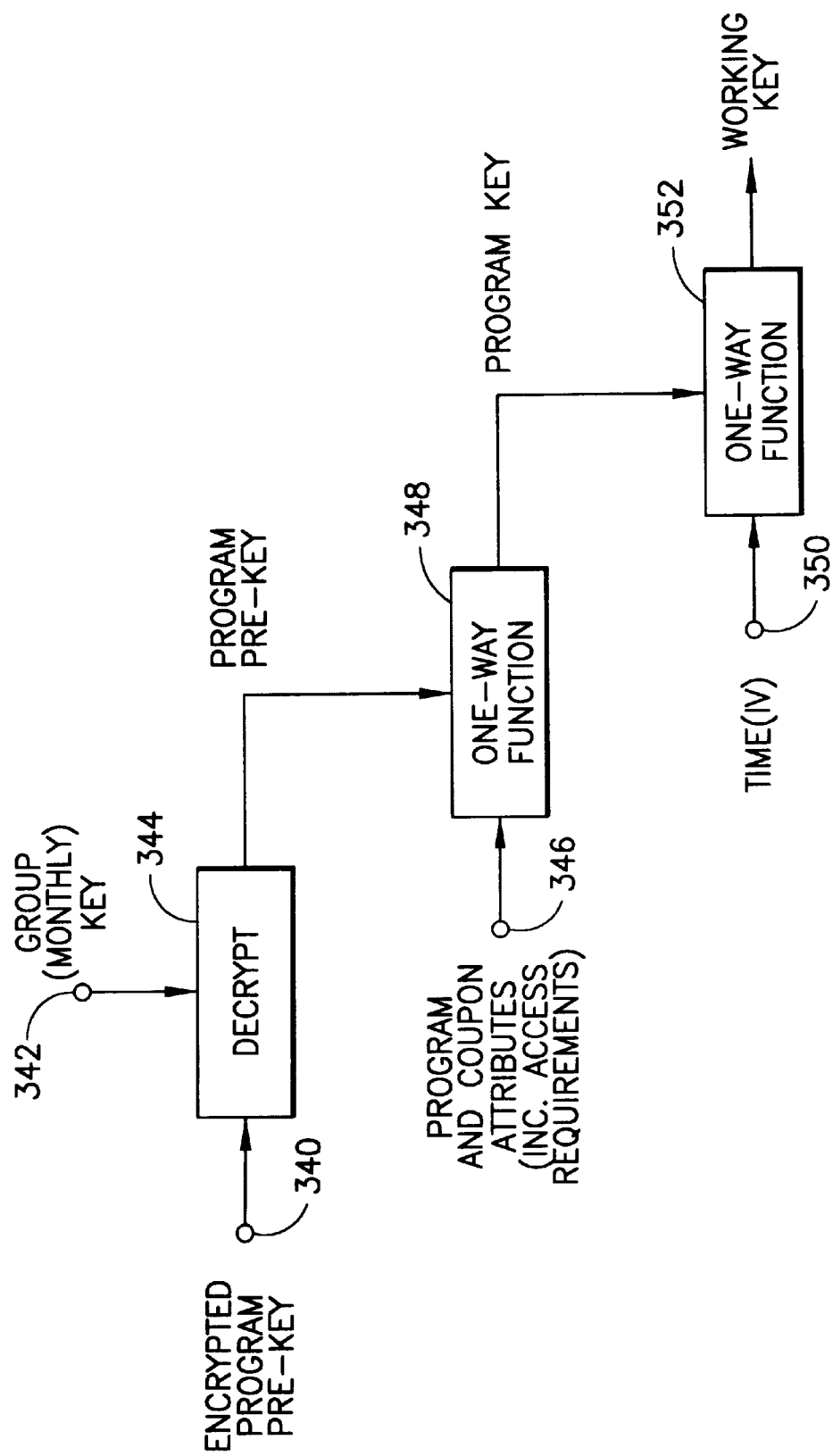
FIG. 3 is a block diagram illustrating a decryption hierarchy for use in accordance with the present invention.

FIG. 3 is a block diagram illustrating a decryption hierarchy for use in accordance with the present invention. An encrypted program pre-key is input via terminal 340 to a decryption function 344 which also receives a monthly group key via terminal 342. The program pre-key is unique to each encrypted program offering (e.g., television program) that is available for decryption. The group key is changed on a periodic basis, e.g., once each month. The decryption function 344 decrypts the encrypted program pre-key to provide a program pre-key that is used as one input to a one-way function 348. The other input to one way function 348 comprises various program and coupon attributes, including access requirements, such as coupon and currency cost, for the corresponding program. The access requirements must be met to obtain authorization to view the program. The program and coupon attributes are input via terminal 346, and the one way function processes the program pre-key and program attributes to provide a program key.

The program key output from one way function 348 is used as one input to another one way function 352 that also receives, via terminal 350, an initialization vector (IV) representative of time. The processing of the initialization vector and program key by one way function 352 generates the working keys required by decryption processor 212 of FIG. 2 to decrypt the program service selected by an authorized user. A further description of the generation of the various keys, including working keys (provided in a "keystream"), can be found in the aforementioned Bennett, et al. patent.

Optionally, the digital coupon information and program services can be encrypted according to a common cryptographic key. This could allow an authenticated file, for example, which represents a coupon image, to be sent to the decoders. The coupon could subsequently be redeemed as an authenticated image by transmitting the coupon from the decoder to the program service provider or other accounting center.

FIG. 4 is an on-screen display for a user interface in accordance with the present invention. The display 400 may be invoked as part of a graphical user interface (GUI) which allows a user to select channels and control other features such as volume and the like. Such interfaces are well known in the art. The display 400 may be controlled by a hand-held remote control, a pointing device, voice command or any other available means. For example, a user may select a PPV program such as a movie from a graphical user interface which causes the display 400 to appear.

The display 400 includes a field 410 which informs the user that he is not currently subscribed to the selected program. That is, the user must order the program. A field 420 informs the user that he has different options in ordering the program. Fields 430–460 present the options. A field 440 presents a first option wherein the movie may be purchased as an impulse pay-per-view (IPPV) program with the cost being deducted from an available cash credit balance. The user is thus informed of the cash cost of the movie and the available cash credit balance. The program can be purchased as long as there is a sufficient cash credit balance.

A field 450 presents a second option, where the program may be purchased using digital coupons alone. The user is informed of the coupon cost of the movie and the available coupon credit balance. The program can be purchased as long as there is a sufficient coupon credit balance. The digital coupons are referred to here as "TV" coupons.

A field 460 presents a third option, where the program may be purchased using a combination of cash and digital coupons. The user is informed of the cost of the movie using both coupons and cash, and the available cash credit balance and coupon credit balance. While only one cash/coupon combination is provided in field 460, it will be understood that other combinations may also be provided. In fact, the coupons may be assigned a cash value for this purpose.

In another option, not shown, a subscriber may order a PPV program for a discount if the subscriber is willing to have commercial messages appear which would not otherwise be present. For example, a commercial message using teletext may appear on the bottom portion of the screen when viewing a PPV movie. Or, with VOD, the PPV movie chosen may have periodic commercial message breaks when the discounted program is selected, whereas no commercials would be provided otherwise.

FIG. 5 is another on-screen display for a user interface in accordance with the present invention. Here, the display 500 provides information on the number of coupon credits which have been accumulated while viewing different channels. For example, the various program service providers may provide viewers with coupons based on the number of hours of that service provider which is viewed per week, and/or which programs were viewed.

Fields 510 and 530 list the various program service providers, while fields 520 and 540 list the number of coupon credits which have been accumulated. For example, for the service provider Home Box Office (HBO), there is a balance of four coupons. In this manner, the program service providers may compete to encourage viewership. For example, when launching a new program, additional coupons may be provided. Furthermore, coupons may be accumulated based on the time of day or day of week that programs are viewed. Moreover, program service providers that are commonly owned may award coupons to encourage viewership of their programs.

Figure 6:
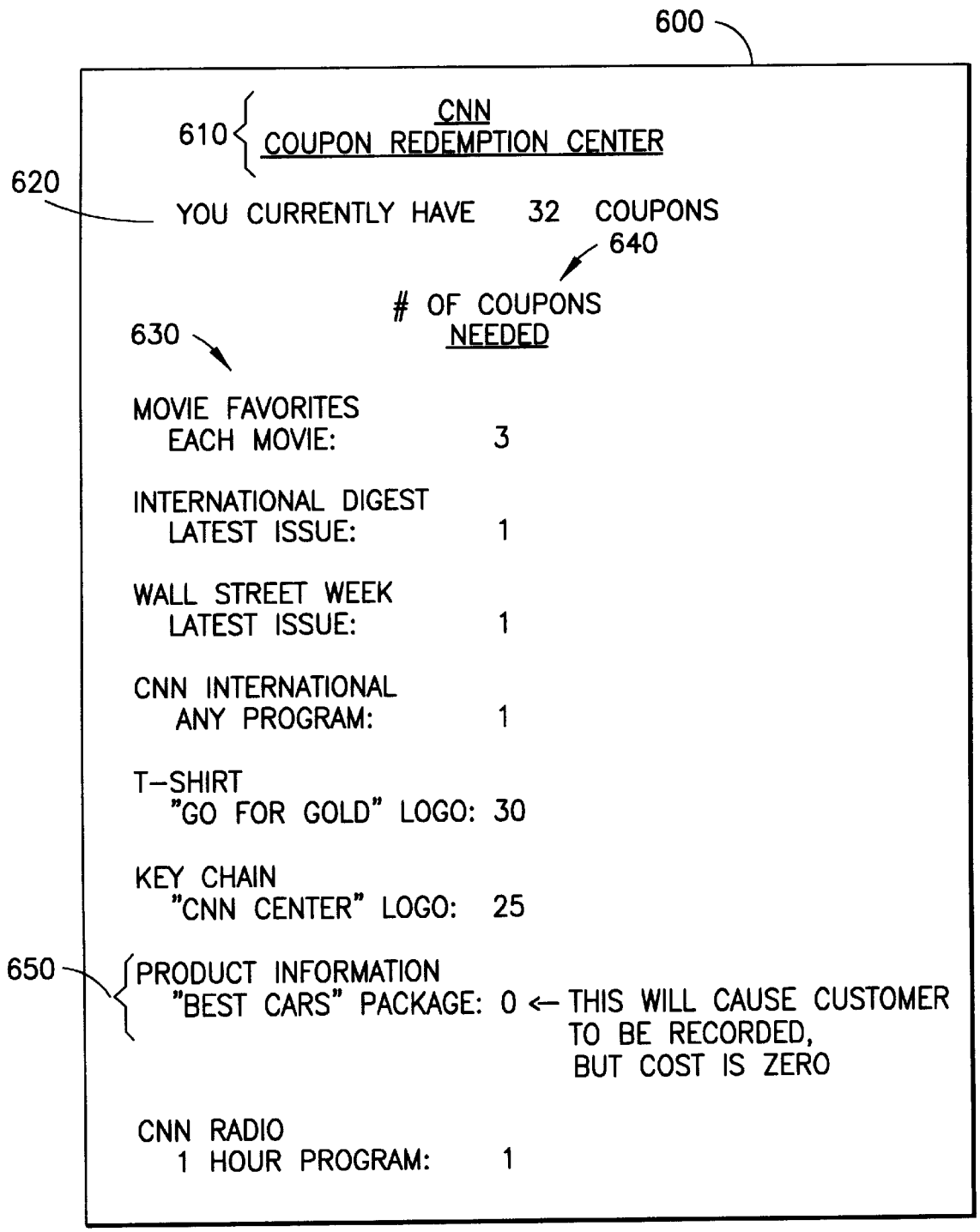
FIG. 6 is yet another on-screen display for a user interface in accordance with the present invention.

FIG. 6 is yet another on-screen display for a user interface in accordance with the present invention. The display 600 provides an example of the variety of items from which the subscriber may select using the digital coupons of the present invention. Moreover, each of the program service providers along with other interested parties may offer their own items. A field 610 indicates that the particular display 600 is that of the service provider Cable News Network (CNN). A field 620 indicates the current coupon credit balance, while a field 630 indicates the items that may be obtained, and field 640 indicates the number of coupons needed to obtain each item.

Thus, the user may redeem the digital coupons for a wide variety of items, including additional programming that can be communicated to, or accessed by, the terminal as well as non-programming items which can be delivered to the user's home, e.g., by mail.

Some items may not require any digital coupons. For example, a field 650 describes product information which can be communicated to the subscriber's terminal or delivered to the subscriber's home at no cost. However, when the subscriber requests the product information, the usage pattern data is updated and may be subsequently provided to the usage pattern data accounting function 125 of FIG. 1, where it may be used for marketing purposes.

Figure 7B:
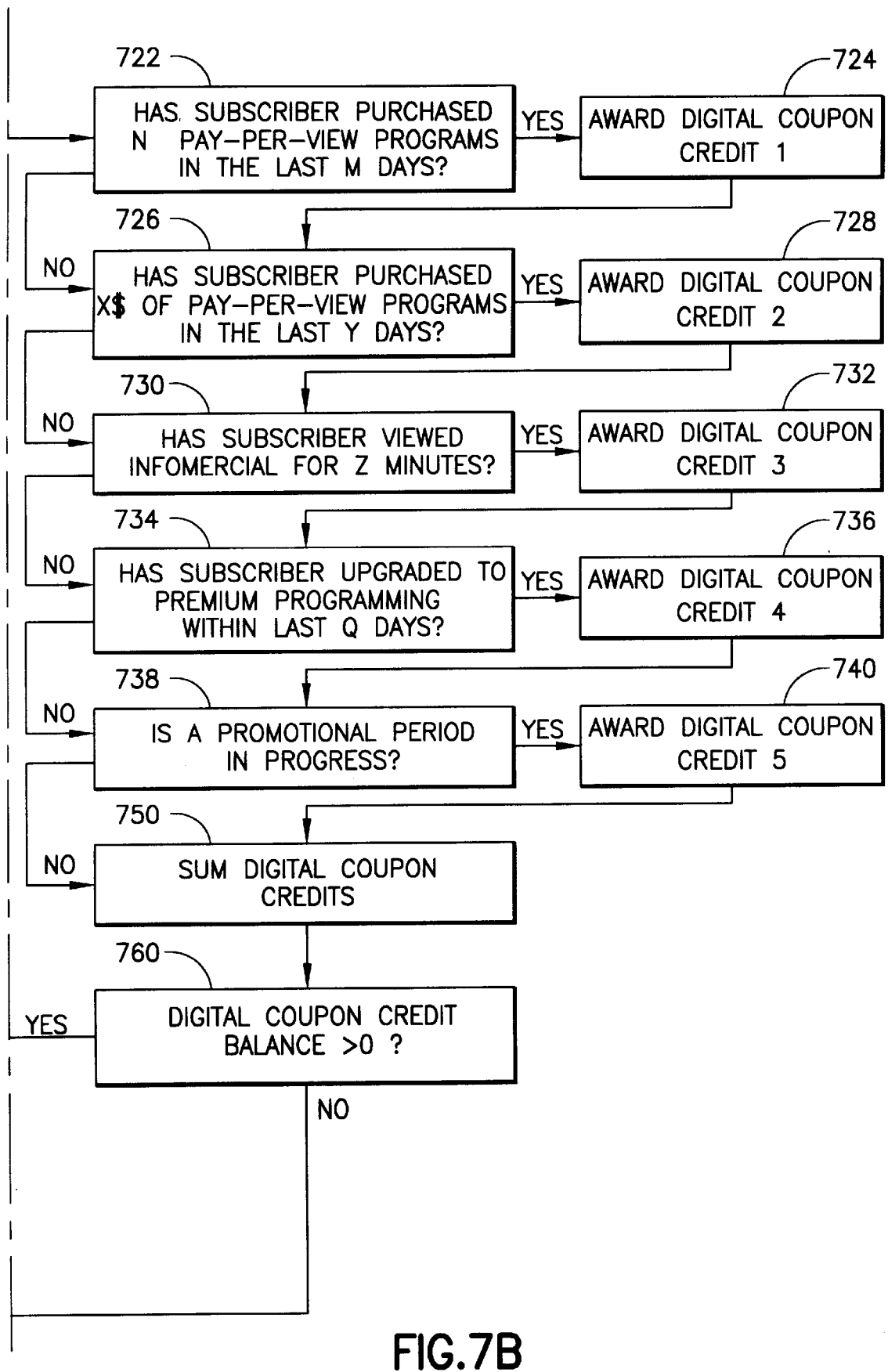
FIG. 7 is a flowchart illustrating a method for providing digital coupons in accordance with the present invention.

FIG. 7 is a flowchart illustrating a method for providing digital coupons in accordance with the present invention. The flowchart describes an embodiment where an initial cash credit balance is provided to a terminal, for example, on a monthly basis. Then, when the user desires to view programming such as PPV programming that has an associated cost, the cost is deducted from the cash credit balance. Furthermore, when the user meets the preconditions of the digital coupon information as determined by the usage pattern data, a coupon credit balance is accumulated. The coupon credit balance may be used to purchase additional program services in lieu of cash, or, optionally, to defray the cost of programs already purchased. In the latter case, the coupon credits may be assigned a cash value.

At block 705, the controller at the transmitter delivers an initial cash credit balance to the terminals. The amount delivered to each terminal may be different and may be based, for example, on past purchasing habits. At block 710, the controller delivers the digital coupon information to the terminals. Again, different terminals may receive different coupon data according to demographic factors and the like. At block 720, the terminal usage pattern is monitored and recorded. In particular, events which meet the preconditions of the digital coupons are recorded, while other data indicative of user habits may also be recorded.

The digital coupon preconditions may account for a variety of events, such as whether the subscriber has purchased a given number N of PPV programs in the last M days (block 722), in which case a digital coupon credit "1" is awarded at block 724. It will be appreciated that different types and amounts of coupons may be awarded according to the particular precondition which the viewer meets. For example, some coupon credits may be more valuable than others, or may be redeemed for different benefits.

At block 726, if it is determined that the subscriber has purchased X$ of PPV programs in the last Y days, a digital coupon credit "2" is awarded at block 728. At block 730, if the subscriber has viewed an "infomercial" for a number Z minutes, a digital coupon "3" is awarded at block 732. An "infomercial" is a commercial message that has the length and format of a regular program, e.g., such as one-half hour or more, and generally garners a relatively small audience. For marketing purposes, it is desirable to reward viewers for viewing infomercials even though there is no charge incurred for viewing the program. Optionally, coupon credit may be awarded only for the first viewing of the program, so additional coupon credits are not awarded for repetitive viewing of the same program.

At block 734, if the subscriber has upgraded from a basic programming tier to a premium programming tier, or to a higher premium programming tier, a digital coupon "4" is awarded at block 736. At block 738, if a promotional period is in progress, a digital coupon "5" is awarded at block 740. Such a promotional period would generally apply to all subscribers.

At block 750, the total amount of coupon credits is determined. At block 760, if the coupon credit balance is above zero, then at block 770, the user is prompted by the user interface (e.g., every time the television is turned on) to select among the various options which are available in redeeming the digital coupons. For example, the subscriber may order PPV programming for a discount or no charge, access premium programming for a predetermined period of time, or simply pass and take advantage of the available options at another time. The various options have been discussed above in greater detail in connection with FIGS. 4–6. In addition to the periodic prompts described above, a user will also have the capability of accessing the coupon redemption menu at any time via the remote control.

At block 780, the digital coupon balance is adjusted by the number of coupons redeemed at block 770, and the monitoring of the terminal usage pattern continues at block 720.

Note that it is possible to verify that the user is actually viewing a particular program by requiring some sort of subscriber involvement. For example, to verify that a subscriber has watched an infomercial for Z minutes, the terminal may require the subscriber to input a command to the user interface. The user interface may provide a message such as "Do you wish to continue", to which the subscriber must respond to meet the digital coupon preconditions. An internal timer within the terminal may be halted until a response is received.

For subscribers who view infomercials and the like, to ensure that only one set of coupons are awarded per program, the COUPON_RECORD_DURATION field as discussed below in Table 3 is provided to indicate a duration in which the program record of the infomercial is stored in the terminal. This precludes the same subscriber from getting repeated coupons for the same infomercial that is run again and again, while still enabling the same program ID for the infomercial to be used repeatedly.

The data delivery syntax set forth below in Tables 1–4 may be used in accordance with the present invention.

Tables 1–3, respectively, describe data fields which may be used when digital coupons are delivered to terminals using an EMM, an IPPV ECM purchase linkage, and a program re-key ECM. Table 4 describes data fields which may be used with all delivery methods. It should be appreciated that the syntax shown is for illustration only and that other data delivery schemes may be substituted.

TABLE 1

| Syntax | Size | Description |
| --- | --- | --- |
| COUPON_PROVIDER_ID | 3 bytes | Identifies coupon sponsor |
| NEW_COUPON_CREDIT | 3 bytes | Absolute number of coupons for service provider in a month |
| NEW_COUPON_DEBIT | 3 bytes | Absolute debit for service provider in a month |
| COUPON_CREDIT | 3 bytes | Total accrued coupons |
| COUPON_SEQ_NUMBER | 1 byte | Epoch (time period) of coupon delivery |

TABLE 2

| Syntax | Size | Description |
| --- | --- | --- |
| COUPON_PROVIDER_ID | 3 bytes | Identifies coupon sponsor |
| COUPON_CREDIT | 1 byte | Coupon credit remaining |

TABLE 3

| Syntax | Size | Description |
| --- | --- | --- |
| COUPON_ID | 2 bytes | COUPON_ID + COUPON_PROVIDER_ID = unique coupon ID) |
| COUPON_PAYOUT_DURATION | 2 bytes | Time period subscriber must view program to obtain coupon credit. |
| COUPON_RECORD_DURATION | 3 bytes | Time period coupon is retained at terminal |
| COUPON_PROVIDER_ID | 3 bytes | Identifies coupon sponsor |

TABLE 4

| Syntax | Size | Description |
| --- | --- | --- |
| COUPON_DEBIT | 2 bytes | Number of accrued coupon debits |
| COUPON_PACKAGE_ID | 2 bytes | Type of coupon for package program |
| IPPV_CREDIT | 2 bytes | Cash credit balance for pay-per-view |
| PACKAGE_PROVIDER_ID | 2 bytes | Identifies service provider of package of programs |
| PKG_COST | 1 byte | Cash charge for package program |
| PKG_ID | 1 byte | Identifies package |
| PROGRAM_PAYOUT_DURATION | 1 byte | Minimum time subscriber must view program to gain credit |
| PROGRAM_INFORMATION | 2 bytes | Video/audio data of program |
| SHOW_COUNT | 2 bytes | Count of shows purchased |
| VH_LIMIT | 2 bytes | View History Limit before report back is mandatory |
| VIDEO PROVIDER ID | 2 bytes | Identifies service provider |

To thwart piracy, digital coupons may only be offered to subscribers with established impulse PPV accounts where there is a report-back capability. This can be effected, for example, by using a bit as a flag in either the group re-key EMM or Program re-key ECM.

The report-back feature discussed above in connection with the usage pattern data accounting function 125 of FIG. 1 allows the program service providers and network controller to monitor the audience size for different programs. The use of digital coupons can therefore allow the service providers to detect viewership patterns over a wide cross-section of programs, and not just premium shows. In other words, shows which are not available through PPV might be made available through coupons.

In the following program delivery scenarios, it is assumed that a real channel (i.e., program) must exist which can be purchased with coupons. This can be enforced by hashing the program information to generate a program key as explained further below. Therefore, a program cannot be viewed using digital coupons unless it is actually offered to coupon holders.

However, pirates may attempt to tamper with the delivery of the coupons. The main objective of the pirate is to defeat the system by providing false messages (e.g., "spoofing") to obtain digital coupons without having to perform any of the coupon preconditions. In accordance with the present invention, different ways to securely delivery the COUPON_CREDIT field to terminals are discussed.

There are three ways to deliver the digital coupons, i.e., using a group re-key EMM, an IPPV purchase linkage, or a program re-key ECM. The group re-key message technique can handle a distribution of coupons to a general population of terminals as well as providing a method that is linked to IPPV purchases. IPPV purchase linkage could be done independently from group re-key message delivery, however. The delivery of coupons via the group re-key message may be mutually exclusive from the program re-key technique since, with the program re-key technique, the network controller or PPV order processing center does not know how many coupons a subscriber might earn using the method where the coupons are generated internally by the terminal. Thus, management of group re-key based coupons cannot be handled as securely inside a terminal unless group re-key based coupons are tracked separately from program re-key based coupons.

Direct delivery of coupons through a group re-key entitlement management message (EMM) is the most straightforward way to control the delivery of coupons to subscribers. This approach is suitable for IPPV service providers who decide to reward particular subscribers based, for example, on previous purchasing volume. The service provider thus knows which particular subscribers are to receive the digital coupons and can therefore direct a unit specific EMM to each of the subscribers.

Additionally, the group re-key EMM approach is suitable for providing subscribers with digital coupons along with a designator which allows text message commercials. These on-screen displays convey advertising and can be overlaid on top of the video and audio displayed. As discussed previously, these subscribers are willing to view such commercials to obtain digital coupon benefits such as discounts on other programs. Again, the service providers know exactly which subscribers agreed to have text message commercials delivered to them, and can therefore provide them with the corresponding digital coupons through an EMM.

Moreover, using the COUPON_CREDIT and VH_LIMIT data fields, individual service providers can send digital coupons to individual subscribers. Each service provider is identified by the field VIDEO_PROVIDER_ID. If a pirate were to synthesize a group key message with a false VIDEO_PROVIDER_ID and COUPON_CREDIT, thereby resulting in a bad group key, the pirate might be able to create false VIDEO_PROVIDER_ID, COUPON_CREDIT pairs inside the terminal.

One solution to the above problem is implemented using EMM authentication. In particular, if the group re-key EMM used by a transmitting satellite, for example, is hashed. The hash is then encrypted to create a signature. A pirate cannot produce a counterfeit group re-key EMM without knowledge of a terminal's unit keys, and the key hierarchy. In this case, the counterfeit message will be rejected without processing. Another way to authenticate a message is to use public key cryptography to sign or encrypt the entire message. This can also prevent the generation of counterfeit messages.

Furthermore, a pirate may use "replay" attacks using legitimately built messages. In this case, a legitimate message is saved and provided to a terminal months after the message was originally created and first used to make new COUPON_CREDIT inside the terminal. To protect against this, group sequence numbers may be incremented.

Moreover, the pirate may attempt to replay the message in the same month that it was generated. To protect against this, new COUPON_CREDIT could be tracked during a particular month. At the end of the month, it can be added to COUPON_CREDIT that was earned in previous months. When the COUPON_CREDIT FIELD is sent to the terminal during the month in the group re-key EMM, it would be the absolute coupon credit issued to a particular terminal. Moreover, an additional field, COUPON_DEBIT, may be created inside the terminal to manage the coupons from a particular service provider for that month. Another way to secure against replay attacks within the same month would be to sequence the EMMs themselves. The decoder may then be able to differentiate between a new message and one that it has seen before. Another method would be to include a date/time parameter in the EMM. As with a sequence number, this field can only go forward or stay the same, but cannot be changed to a past value.

For each individual service provider, any new COUPON_CREDIT value must be authenticated, e.g., in the group re-key message just as with the COUPON_CREDIT and VH_LIMIT fields since merely signing the message or using public key cryptography will not prevent such replay attacks. Moreover, each new coupon record should track the sequence number which indicates when it was generated. When the group key epoch occurs, the group re-key EMM that was originally used to create the coupon record will not be able to create additional coupons since the message will be old. At that time, the new COUPON_CREDIT can be added to old COUPON_CREDIT. If, during the next month, no new coupons are sent to the terminal, and all of the existing coupons are used, then the entire coupon record can be erased.

In a second digital coupon delivery method, coupons are delivered through an IPPV buy linkage. With each IPPV purchase, a bit in the program re-key message allows a service provider to deliver one or more coupons automatically and instantly to subscribers without waiting to get a report back or performing a "trip" (e.g., delivery) with coupons as in the group re-key method discussed above. If a subscriber did not have any coupons from a particular service provider before, a new service provider coupon record is made. The coupon creation process is therefore tightly linked to actual purchases of IPPV programs. After a number of coupons have been accrued, the subscriber can redeem them. Typically, a service provider will offer digital coupons which can be redeemed only for that service provider's programs. However, groups of service providers may collaborate to provide interchangeable coupons if desired.

In another possible pirate attack, a pirate may attempt to manipulate the number of coupons which are awarded when performing the digital coupon preconditions, e.g., such as purchasing a number of IPPV programs. One possible solution uses a DES hash with encryption (e.g., signature) or public key encryption of the program re-key message. If the number of coupons is authenticated in the IPPV report-back, then the pirate's manipulation of this field would cause a bad cryptographic field.

If the pirate does know the group key, counterfeiting could occur but may be detectable if the view history information (e.g., usage pattern data) is used to hash the coupon value and is sent along in the report-back.

Moreover, if public key cryptography was used in the delivery of the program re-key message, then, even if the pirate knew the group public key, a message still could not be synthesized since the group private key would not be known. Public key cryptography has a distinct advantage over secret key cryptography since the group encrypt or private key is not in the terminal. Consequently, VLSI probing and other attacks against the terminal cannot reveal the key.

In a third delivery method in accordance with the present invention, digital coupons are delivered in conjunction with extended commercial programs known as "infomercials." Preferably, a subscriber is rewarded with digital coupon credits only after viewing the program for a specific amount of time. Furthermore, to prevent the subscriber from simply tuning in the program and walking away, it might be advantageous to require some sort of subscriber involvement such as a control input which is requested by the user interface.

A pirate may be able to alter code in a non-secure processor to automatically provide the subscriber involvement control signal. However, the amount of time that the program must be viewed, or at least tuned in, can be secured. To do this, there is no need to track the maximum time that the program lasts since the infomercial service provider is essentially paying the subscriber to view the program. The PROGRAM_PAYOUT_DURATION field can be loaded into a countdown timer to enforce the minimum viewing time requirement of the digital coupon preconditions. The coupons are thus issued when the timer counts down to zero, and the timer counts down only when the infomercial channel is tuned in. Essentially, this ties up the terminal to tune in the infomercial and precludes it from tuning in another channel.

Furthermore, the COUPON_RECORD_DURATION field is required to determine when the program record should be expunged from the secure processor's memory.

A pirate may attempt to manipulate the field in the program re-key ECM, which indicates how many coupons are to be awarded when viewing the infomercial. One possible solution is to use a DES hash (e.g., signature) or public key encryption of the program re-key message. Like the other attacks described above, signing the program re-key message makes it hard for the pirate to counterfeit the program re-key message without knowledge of the group secret key or private key. Moreover, if public key cryptography is used in the delivery of the program re-key message, then, even if the group public key was known by a pirate, a message could not be synthesized since the group private key is not known.

In another possible pirate attack, the pirate records legitimate program messages, and repeatedly plays back the messages to the terminal. The pirate may modify the terminal to provide control inputs directly to the chip or via the user interface to increase the number of coupons held by the chip. One solution to this attack is to create and store a program record in memory. In particular, the COUPON_CREDIT field is used to authenticate the number of coupons being awarded. In addition to COUPON_PKG_ID and COUPON_PROVIDER_ID, two duration timers are needed instead of one. One timer, COUPON_PAYOUT_DURATION, tracks how long the subscriber must be tuned to the program before coupons are awarded, and the other time, COUPON_RECORD_DURATION, tracks when the program record can be expired from memory. The amount of time that a record should be retained might be two months, for example.

Delivery of program re-key messages by public key is a safer mechanism. A pirate would need to cryptographically search for the group private key to alter program re-key messages. The group private key is not delivered to any terminal anywhere in the network. The length of the group public keys delivered could expand according to the perceived piracy threat. And, the group public and private keys may be changed through the delivery of new EMMs. If there is a system breach, the infomercial feature could be abandoned simply by making program re-key ECMs with the coupon issuing feature missing, or not allowing IPPV purchases with coupons.

In the above discussion, it was seen that there are three distinct methods for delivering coupons to the terminals. The first is group re-key EMM based, the second is tightly tied to IPPV authentication, and the third is Program Re-key ECM based using the "infomercial" concept.

The group re-key method is similar to how IPPV is implemented with the only absolute COUPON_CREDIT given, and requiring a COUPON_DEBIT field to exist inside the terminal for each service provider with a COUPON_PROVIDER_ID.

The IPPV purchase linkage method is a hybrid between the group re-key method and the program re-key method since it takes advantage of IPPV authentication that is already done and securely authenticated inside the terminal, and yet is delivered by a program re-key ECM with the appropriate parameters set. Coupons using this method can only be delivered through a real IPPV purchase.

With the program re-key method, coupon redemption may or may not be tied to the view history report-back. For auditing of viewership, coupon redemption is tied to the report-back since a communication link such as a telephone network is required.

Accordingly, it can be seen that the present invention provides a system for transmitting digital coupons to subscriber terminals for various promotional purposes. By delivering and managing the coupons electronically, the coupons are more likely to be used by the subscribers, and distribution and handling costs for the promoters are significantly reduced. Subscriber loyalty can be rewarded, while subscribers can also be selectively targeted to try out programming in which they are likely to have a special interest. Subscribers can be even be encouraged to view commercial programming such as infomercials. Additionally, with an optional report back feature, terminal usage pattern data can be retrieved and analyzed to determine the effectiveness of the promotions and to gather additional demographic and individual data. Furthermore, the integrity of the scheme can be assured with various encryption techniques.

Although the invention has been described in connection with various specific embodiments, those skilled in the art will appreciate that numerous adaptations and modifications may be made thereto without departing from the spirit and scope of the invention as set forth in the claims.

For example, accounting of the coupon credit balance may be maintained by the network controller or other entity apart from the terminal. This accounting may be updated real-time as the coupon balance changes, or periodically, such as where an automatic telephone report back capability is provided.

What is claimed is:

1. A transmitting end apparatus of a subscriber television network, comprising:

a programming services data function for providing programming services;

a digital coupon information function for providing digital coupon information; and a controller; wherein:

said controller is responsive to said programming services function for transmitting the programming services to a plurality of subscriber terminals of the network via a communication channel;

said programming services are adapted to be recovered by said subscriber terminals;

said controller is responsive to said digital coupon information function for delivering the digital coupon information to said terminals via said communication channel;

said digital coupon information defines preconditions for enabling said terminals to obtain credits when recovering the programming services; and said digital coupon information enables the terminals to maintain a running credit balance according to credits obtained and credits redeemed.

2. The apparatus of claim 1, wherein:

the credits are redeemable by users at the respective terminals for obtaining programming services at a reduced charge.

3. The apparatus of claim 1, wherein:

the preconditions require that the respective terminals recover particular programming services to obtain credits.

4. The apparatus of claim 1, wherein:

the preconditions require that the respective terminals recover a specified number of the programming services to obtain credits.

5. The apparatus of claim 1, wherein:

the preconditions require that the respective terminals recover the programming services for a specified duration to obtain credits.

6. The apparatus of claim 1, wherein:

the preconditions require that the respective terminals incur a specified amount of charges in recovering the programming services to obtain credits.

7. The apparatus of claim 1, further comprising:

encryption means operatively associated with said controller for encrypting said digital coupon information and said programming services, prior to transmission to the terminals, according to a common cryptographic key.

8. The apparatus of claim 1, wherein:
said digital coupon information function provides different digital coupon information for different ones of the terminals.

9. The apparatus of claim 8, further comprising:
a usage pattern accounting center operatively associated with said controller, and adapted to receive usage pattern data from the terminals; wherein:
said digital coupon information function is responsive to said usage pattern accounting center and said usage pattern data for providing the different digital coupon information.

10. The apparatus of claim 9, wherein:
the usage pattern data indicates a viewing history of the programming services at the terminals over a specified time period.

11. The apparatus of claim 1, wherein:
the controller transmits data to the terminals via the communication channel for establishing an initial credit balance at the terminals.

12. A transmitting end method for a subscriber television network, comprising the steps of:
providing programming services and digital coupon information at the transmitting end; and
transmitting the programming services and the digital coupon information from the transmitting end to a plurality of subscriber terminals of the network via a communication channel; wherein:
the programming services are adapted to be recovered by the subscriber terminals;
the digital coupon information defines preconditions for enabling the terminals to obtain credits when recovering the programming services; and
the digital coupon information enables the terminals to maintain a running credit balance according to credits obtained and credits redeemed.

13. The method of claim 12, wherein:
said credits are redeemable by users at the respective terminals for obtaining programming services at a reduced charge.

14. The method of claim 12, wherein:
the preconditions require that the respective terminals recover particular programming services to obtain credits.

15. The method of claim 12, wherein:
the preconditions require that the respective terminals recover a specified number of the programming services to obtain credits.

16. The method of claim 12, wherein:
the preconditions require that the respective terminals recover the programming services for a specified duration to obtain credits.

17. The method of claim 12, wherein:
the preconditions require that the respective terminals incur a specified amount of charges in recovering the programming services to obtain credits.

18. The method of claim 12, comprising the further step of:
encrypting said digital coupon information and said programming services at the transmitting end, prior to transmission to the terminals, according to a common cryptographic key.

19. The method of claim 12, comprising the further step of:
providing different digital coupon information for different ones of the terminals.

20. The method of claim 19, comprising the further step of:
receiving usage pattern data from the terminals at the transmitting end; wherein:
the different digital coupon information is provided in response to the usage pattern data.

21. The method of claim 20, wherein:
the usage pattern data indicates a viewing history of the programming services at the terminals over a specified time period.

22. The method of claim 12, comprising the further step of:
transmitting data from the transmitting end to the terminals via the communication channel for establishing an initial credit balance at the terminals.

23. A subscriber terminal in a subscriber television network, comprising:
means for recovering programming services and digital coupon information from a transmitting end of the network via a communication channel;
means for processing said digital coupon information to determine preconditions thereof for enabling the terminal to obtain credits when recovering the programming services; and
means for maintaining a running credit balance according to credits obtained and credits redeemed.

24. The terminal of claim 23, wherein:
said credits are redeemable by a user at the terminal for obtaining programming services at a reduced charge.

25. The terminal of claim 23, wherein:
the preconditions require that the terminal recover particular programming services to obtain credits.

26. The terminal of claim 23, wherein:
the preconditions require that the terminal recover a specified number of the programming services to obtain credits.

27. The terminal of claim 23, wherein:
the preconditions require that the terminal recover the programming services for a specified duration to obtain credits.

28. The terminal of claim 23, wherein:
the preconditions require that the terminal incur a specified amount of charges in recovering the programming services to obtain credits.

29. The terminal of claim 23, wherein:
the digital coupon information is customized for the terminal.

30. The terminal of claim 23, further comprising:
monitoring means for monitoring a usage pattern of the terminal to determine if said preconditions have been satisfied; wherein:
said maintaining means is responsive to said monitoring means for maintaining said running credit balance.

31. The terminal of claim 30, further comprising:
a communication interface for communicating data indicative of said usage pattern from said monitoring means to a usage pattern accounting center at the transmitting end; wherein:
said usage pattern data enables the transmitting end to customize the digital coupon information provided to the terminal.

32. The terminal of claim 30, wherein:
the usage pattern indicates a viewing history of the programming services at the terminal over a specified time period.

33. The terminal of claim 23, wherein:

said maintaining means is adapted to establish an initial credit balance in response to data received from the transmitting end.

34. The terminal of claim 23, further comprising:

a user interface for enabling the terminal to redeem said credits according to a user input.

35. The terminal of claim 23, wherein said digital coupon information and said programming services are encrypted at the transmitting end according to a common cryptographic key, further comprising:

decryption means for decrypting said digital coupon information and said programming services.

36. The terminal of claim 35, further comprising:

authentication means for cryptographically authenticating said digital coupon information.

37. The terminal of claim 36, wherein:

said authentication means authenticates said digital coupon information according to a group key.

38. The terminal of claim 36, wherein:

said authentication means authenticates said digital coupon information according to a public key.

39. The terminal of claim 23, wherein:

said programming services include programs which are encrypted according to associated program re-keys; and at least a particular one of said program re-keys is transmitted to the terminal from the transmitting end to allow the terminal to decrypt and recover the associated program using said program re-key; and said digital coupon information is transmitted to the terminal with said program re-keys.

40. A data processing method for a terminal in a subscriber television network, comprising the steps of:

recovering programming services and digital coupon information from a transmitting end of the network via a communication channel;

processing said digital coupon information to determine preconditions thereof for enabling the terminal to obtain credits when recovering the programming services; and maintaining a running credit balance according to credits obtained and credits redeemed.

41. The method of claim 40, wherein:

said credits are redeemable by a user at the terminal for obtaining programming services at a reduced charge.

42. The method of claim 40, wherein:

the preconditions require that the terminal recover particular programming services to obtain credits.

43. The method of claim 40, wherein:

the preconditions require that the terminal recover a specified number of the programming services to obtain credits.

44. The method of claim 40, wherein:

the preconditions require that the terminal recover the programming services for a specified duration to obtain credits.

45. The method of claim 40, wherein:

the preconditions require that the terminal incur a specified amount of charges in recovering the programming services to obtain credits.

46. The method of claim 40, wherein:

the digital coupon information is customized for the terminal.

47. The method of claim 40, comprising the further step of:

monitoring a usage pattern of the terminal to determine if said preconditions have been satisfied; wherein:
said maintaining step is responsive to said monitoring step.

48. The method of claim 47, comprising the further step of:

communicating data indicative of said usage pattern from the terminal to a usage pattern accounting center at the transmitting end; wherein:
said usage pattern data enables the transmitting end to customize the digital coupon information provided to the terminal.

49. The method of claim 47, wherein:

the usage pattern indicates a viewing history of the programming services at the terminal over a specified time period.

50. The method of claim 40, comprising the further step of:

establishing an initial credit balance in response to data received from the transmitting end.

51. The method of claim 40, comprising the further step of:

receiving a user input to redeem the credits.

* * * * *